United States Patent [19]

Schütze

[11] Patent Number: 4,652,171
[45] Date of Patent: Mar. 24, 1987

[54] CONNECTING ELEMENT FOR ROD LIKE MEMBERS

[75] Inventor: Rainer Schütze, Brunswick, Fed. Rep. of Germany

[73] Assignee: Deutsche Forschungs, Fed. Rep. of Germany

[21] Appl. No.: 694,951

[22] Filed: Jan. 25, 1985

Related U.S. Application Data

[62] Division of Ser. No. 567,958, Jan. 4, 1985, abandoned.

[51] Int. Cl.⁴ ............................................. F16B 7/00
[52] U.S. Cl. .............................. 403/403; 403/205; 403/267
[58] Field of Search .................. 156/182, 304.3, 304.2, 156/294, 293; 403/267, 64, 231, 286, 404, 169, 179, 265, 263, 205, 403, 390, 391; 428/318.4, 309.9

[56] References Cited

U.S. PATENT DOCUMENTS

| | | | |
|---|---|---|---|
| 926,974 | 7/1909 | Berliner | 403/267 |
| 1,915,215 | 6/1933 | Carpenter | 403/403 |
| 3,666,586 | 5/1972 | Lacey | 156/304.3 |
| 4,384,802 | 5/1983 | Gottenberg | 403/403 |

Primary Examiner—Michael Ball
Attorney, Agent, or Firm—Gottlieb, Rackman & Reisman

[57] ABSTRACT

Method and device for the manufacture of rod-shaped constructional elements of large extension. A core of foam material, inherently stable at right angles to its longitudinal extension, is guided horizontally. At least one dry unidirectional layer of fibres is applied on to the surface of the core. The surface of the unidirectional layer of fibres is wetted with synthetic resin. At least one braided hose with dry fibres crossing one another at an angle is applied on to the wetted surface. The strand manufactured in this way is separated into predetermined sections. The separated strand is held in the desired configuration of the constructional elements during hardening of the synthetic resin.

4 Claims, 14 Drawing Figures

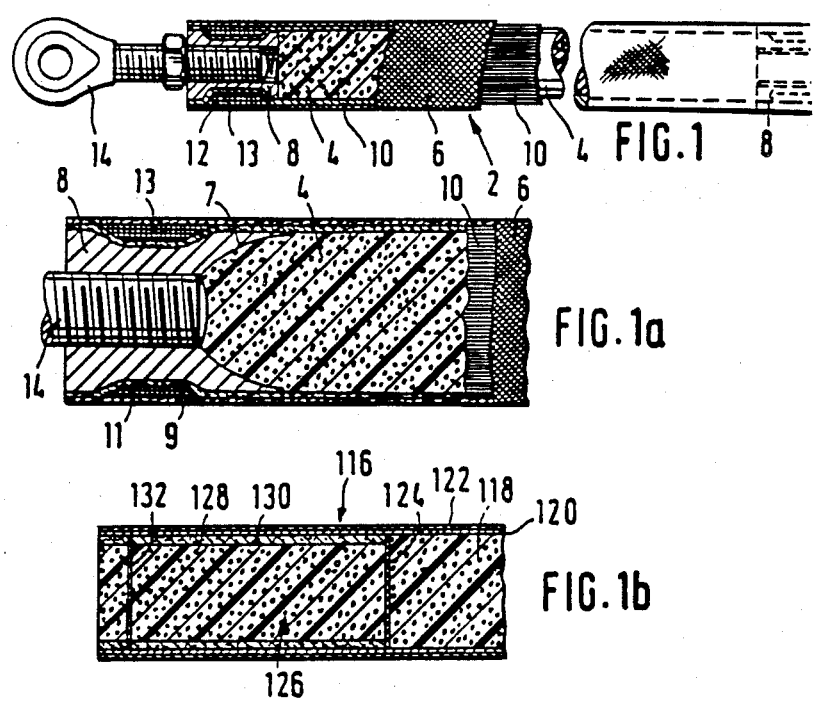
FIG. 1
FIG. 1a
FIG. 1b
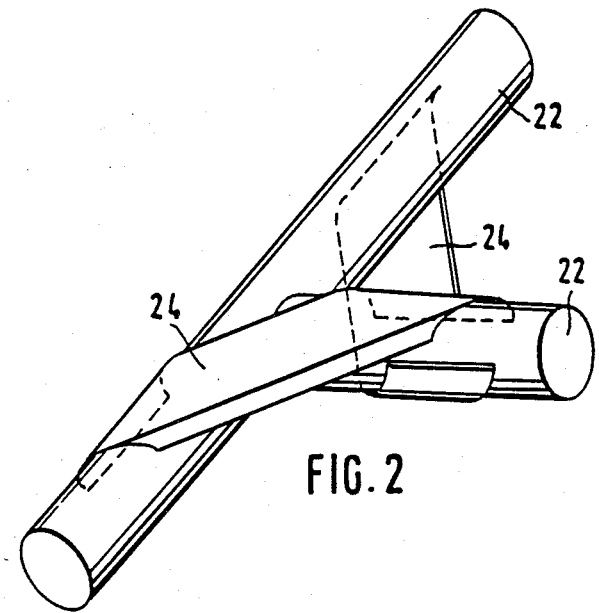
FIG. 2

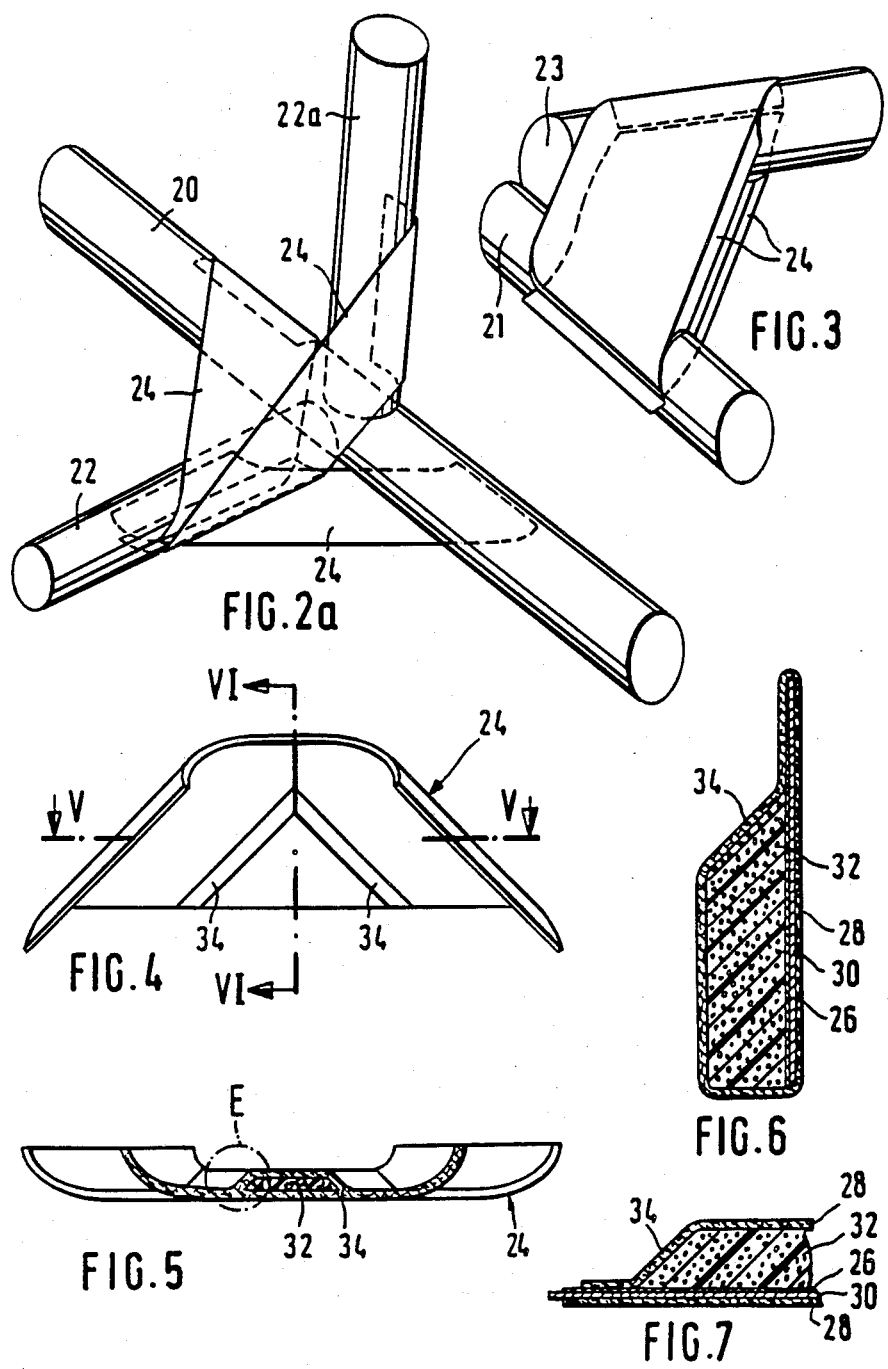

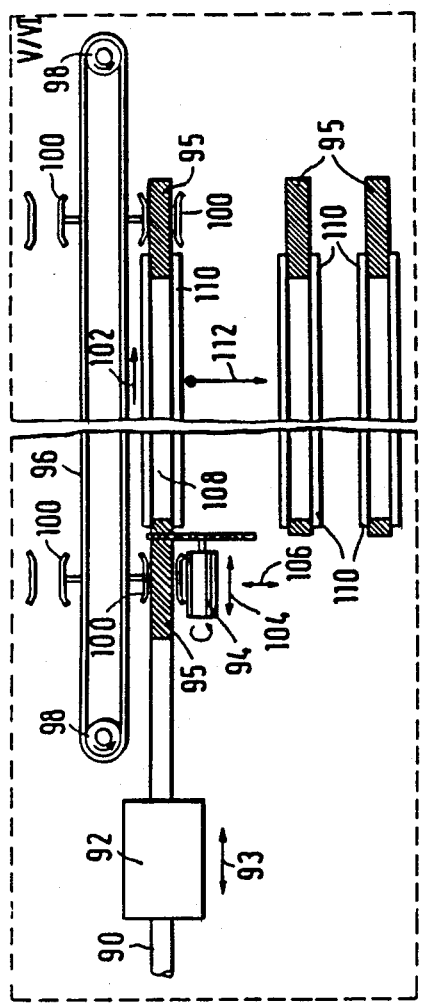
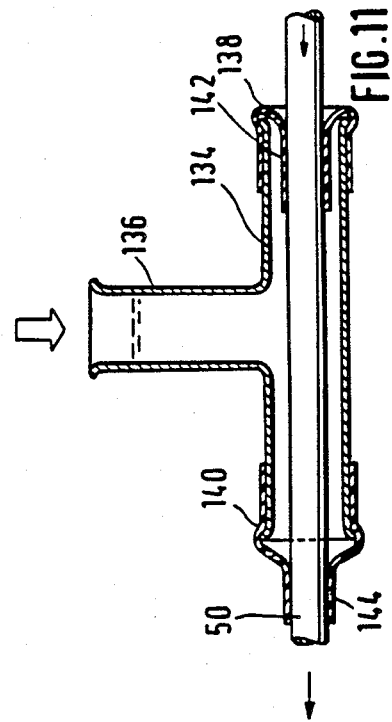
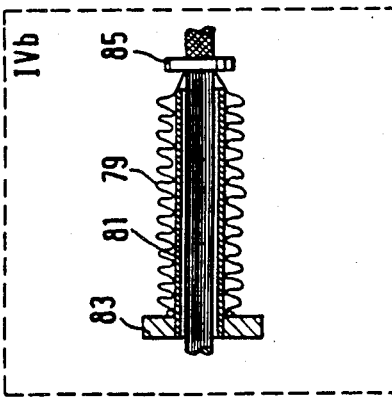

CONNECTING ELEMENT FOR ROD LIKE MEMBERS

This application is a division of application Ser. No. 567,958, filed 01-04-85, abandoned.

The invention concerns a method for the manufacture of rod-shaped constructional elements of large extension in which there are mounted on a core of foam material inherently stable in a direction at right angles to its longitudinal extension at least one layer of unidirectional fibres parallel to the axis (UD-layer) and above this fibre layer at least one layer in which the fibres cross one another at an angle to the axis, the layers being applied one after the other, where the fibres are embedded in an age-hardening synthetic resin, and a device to carry out the method.

The invention also concerns a special design of a constructional element of rod shape as well as constructional elements to produce a joint between two rod shaped elements situated at an angle to one another.

In a known method (DE-OS No. 28 55 683) the core, consisting of a synthetic material, is guided vertically, and, in particular by means of guide nozzles, in the neighbourhood of which the fibres are fed, in each case. The fibres are here soaked in synthetic resin before application on to the core.

There is also known a method for the manufacture of tubular bodies in which a non-stick layer is first applied to a rigid horizontally guided mandrel. Synthetic resin is then applied on to the surface of this layer and then first a layer of UD-fibres on to which there is subsequently applied a band which extends in the form of a screw with an opposite direction of winding. There is then also provided a separating device by means of which the tube constructed in this way is separated from the mandrel. The mandrel tubes are pulled out after hardening of the synthetic resin (U.S. Pat. No. 2,723,705).

It is the object of the invention to devise a method by means of which rod shaped constructional elements of the type described can be fabricated at favourable cost.

This object is solved according to the invention in that the core is guided horizontally during application of the fibres, that at least one unidirectional layer of dry fibres is applied to the surface of the core, that the surface of the unidirectional layer of fibres is wetted with synthetic resin, that there is applied to the wetted surface at least one braided hose with dry fibres crossing one another at an angle, that the surface of the braided hose is wetted with synthetic resin, that the strand manufactured in this way is separated at predetermined sections and that the separated strands are held in the desired configuration of the constructional elements while the synthetic resin hardens.

Convenient embodiments of the method and a device to carry out the method form the subject of additional claims.

An additional subject of the invention is a special design of a rod shaped constructional element which is able to accept locally concentrated transverse forces.

An additional subject of the invention is a constructional element by means of which it is possible to join together by cementing two rod shaped constructional elements situated at an angle to one another.

The invention is illustrated in its various aspects in the drawings by means of examples and is described in detail in the following with reference to the drawings.

FIG. 1 shows in side view, partly cut away, a constructional element according to the invention made up by means of force transmitting elements.

FIG. 1a shows in cross section one end of a constructional element with a force transmitting element.

FIG. 1b shows a longitudinal section through part of a constructional element with strengthening for the acceptance of local transverse forces.

FIG. 2 shows in perspective a plane butt joint for two rod shaped constructional elements.

FIG. 2a shows in perspective a spatial joint between three rod shaped constructional elements.

FIG. 3 shows in perspective an angle joint between two rod shaped constructional elements.

FIG. 4 shows in plan view a connecting element according to the invention.

FIG. 5 shows a section along the line V—V in FIG. 4.

FIG. 6 shows a section along the line VI—VI in FIG. 4 in an enlarged representation.

FIG. 7 shows a detail corresponding with the dot-dash circle E in FIG. 5.

Figure 8:
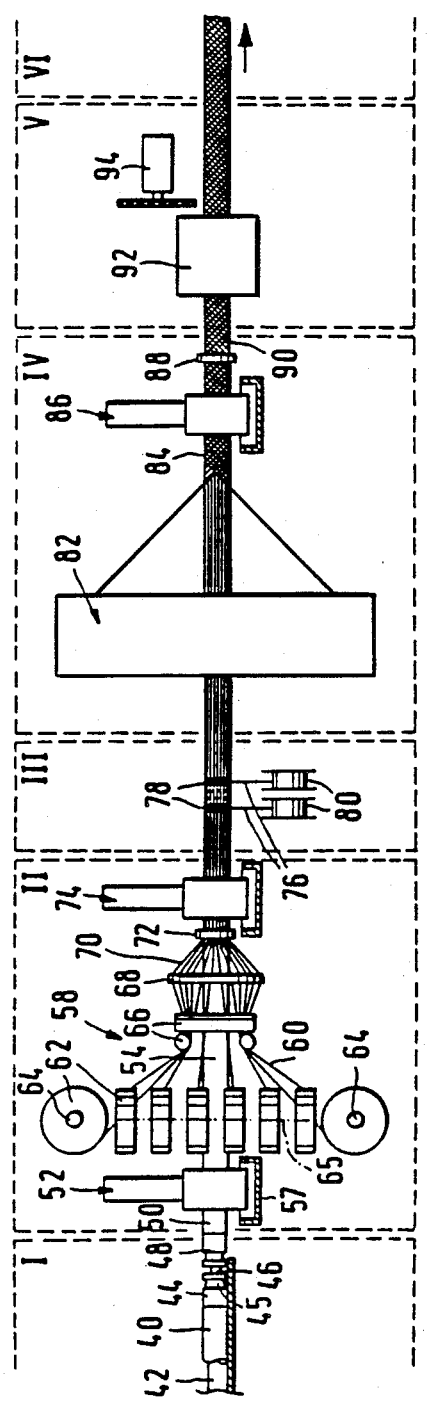
FIG. 8 shows schematically a form of embodiment of a device to carry out the method according to the invention.

FIG. 9 again shows schematically the final station of the device according to FIG. 8.

FIG. 10 shows a different form of embodiment of that station of the device by means of which the braided hose is applied.

FIG. 11 shows in cross section a device for the application of the synthetic resin.

FIG. 1 illustrates a rod shaped constructional element 2 which has a large extension, that is a large ratio of length to diameter. The constructional element has a core 4, at least one layer 10 of unidirectional fibres parallel to the axis—termed UD-layer or UD-coat in the following—and above this at least one braided hose 6. The UD-layer 10 and the braided hose 6 are stiffened with synthetic resin. In the example of embodiment illustrated here, there are arranged at each end of the constructional element force transmitting elements 8, which in this case are designed as threaded bushings and which are overlapped by the UD-layer and the braided hose 6.

The core 4, which in general has a circular cross section, is designed in such a way that it is inherently stable in the transverse direction. No special stability requirements are laid down for the core in the longitudinal direction. The core preferably consists of a hard foam and may be produced in the desired cross section either by foaming or may also be produced by cutting out from plates or blocks. Circular cross sections can be fabricated with sufficient accuracy by grinding. The cores could also be drop shaped in cross section or could have another form. In such rod shaped constructional elements, the special advantage of which resides in the fact that they can be manufactured with very thin fibre walls, the full core acts against failure due to buckling. Wall thicknesses less than 0.5 mm are, for example, typical.

Since the core does not need to have any longitudinal stiffness, it may, in addition, by made up in great lengths from short lengths of full core which may be cemented together at their front ends. Force transmitting elements are, in general, cemented on to the neighbouring front face of the core 4. Force transmitting elements neighbouring on one another can be joined together by means of short sections of core. The force transmitting elements 8 are provided with internal threads, into which connecting elements 14 can be screwed as shown on the left in FIG. 1.

Since the core has no bending strength, the constructional element must be held in its desired configuration during hardening of the synthetic resin. This is, for example, possible for a straight constructional element in that during hardening the constructional element in suspended with a vertical axis where stretching can be ensured by loading with weights. Preferably, however, the constructional element is held during hardening in an elongated aligning member with a V-shaped supporting groove or the like. In this case the aligning member should be designed in such a way that, as far as is possible, a line contact is achieved. In so far as it is necessary anti-stick coating should be provided.

The constructional elements could also be designed to be curved, for example a constructional element to be used as a push rod may be provided with sections of arc shape by means of which a parallel displacement of the end sections of the constructional element is brought about. Arcs with radii greater than twenty times the diameter of a constructional element of circular cross section can be bent without change in the cross section. If smaller radii are required the core may be designed to be laminated in the longitudinal direction so that the individual lamellae are then able to move relative to one another during bending. For manipulation the individual lamellae may be joined by means of a cement with low shear resistance.

Curved constructional elements are held in suitably shaped devices during hardening of the synthetic resin.

In the example of embodiment according to FIG. 1 the force transmitting element 8 illustrated on the left is provided with a flat annular groove 12 and the UD-layer is held in contact with the base of this annular groove 12 by means of an annular winding 13 of threads wetted with synthetic resin.

FIG. 1a illustrates details of the force transmitting element 8. Here the annular groove 12 has a cylindrical section 11 of base which leads into a flat area 9 in the external circumference at the rear end of the force transmitting element. This arc should be so designed as to produce as low a bending loading of the fibres as possible. In order to save weight the force transmitting element 8 is provided with a recess 7 on the rear side facing towards the core.

In order to achieve predetermined strength properties it is also possible to vary the number of braided fibre hoses as well as the number of UD-layers. Additional UD-layers or sections of braided hose which extend only over partial lengths of the constructional element may also be provided. As fibrous material it is possible to use any known fibres used for composite fibrous materials, the material constants of said fibres then become factors in the achievable strength and stiffness. Typical materials are, for example, glass fibres, aramid fibres, carbon fibres and the like. The so-called "rovings" may conveniently be used as fibres. Carbon rovings with 3000, 6000 or 12,000 individual fibres are commercially available. The same holds for fibres of other materials.

When hard foam cores are used a hard foam with pores of the greatest possible fineness should be employed in order to keep uptake of resin by the core as low as possible. A fine pore acrylic foam with a volume-weight of 50 kp/m$^3$ has been found to be convenient.

Constructional elements according to the invention can be manufactured with relatively small diameters. Thus they can be used as push or driving rods for rudders and flaps of aircraft and, in particular, as substitutes for the steel and aluminium tubes usual at the present time.

Constructional elements according to the invention with the small diameter which it is possible to produce can also be advantageously used for the construction of frame structures. For example, FIG. 2 illustrates a T-junction of two constructional elements. Here a rod 22 is connected at right angles to a continuous rod 20. The rod 22 impinges flat against the rod 20, where it is not necessary that it should strike against the rod 20 with its front face. The joint is produced by means of two connecting elements 24 which are constructed similarly and which can be manufactured in the same way as the constructional elements themselves.

The angle joints illustrated in FIG. 3 are constructed in a similar manner. Here the rod 23 impinges laterally against the end of the rod 21, which may for example be provided with a force transmitting element by means of which it is possible, for example, to produce a connection with another framework or the like. The joint between the two rods 21 and 23 is here produced by means of a connecting element 24. A second connecting element—shown in dashed lines—can be arranged in mirror image fashion opposite to the first connecting element 24 when increased demands have to be met.

An opposite arrangement in mirror image form of two connecting elements 24 would also be possible in the T-junction joint according to FIG. 2.

An extended joint is illustrated in FIG. 2a. Here an additional rod 22a is connected to the continuous rod 20 at right angles to the rod 22. The joint is here made by means of three connecting elements 24.

Details of the connecting elements 24 are illustrated in FIGS. 4 to 7.

As can be seen from FIGS. 6 and 7, the connecting element 24 has a core 26 in the form of a sheet against which there is applied a braided fibre hose 28. The braided hose 28 is secured in its breadth against constriction by means of the core 26 of sheet form which may, for example, consist of a stiff sheet of paper. An UD-coat is arranged on the core 26 on one side. A core strengthening 32, consisting of foam material, is arranged on the core 26 opposite to the UD-coat 30. As can be seen from FIG. 4, the core strengthening 32 has the form of a triangle one side of which is limited by a longitudinal edge of the core 26 of sheet form and which slopes away from the core of sheet form 26 on the two remaining sides 34.

For manufacture of the connecting elements it is possible to cement the core strengthenings 32 at suitable distances on to a continuous sheet-like core. The UD-coat 30 is fixed on the opposite side of the core. The braided hose 28 is then stretched on to a core strip formed in this way. Sections of trapezoidal form in plan view are then cut out from a basic element formed in this way where, in each case, the core strengthening 32 is situated at the centre. These blanks are soaked in synthetic resin. They are then inserted into a mould in which the areas bordering on the sloping sides receive a curvature which corresponds with the radius of the rods to be connected. The angle of wrap around should be at least 90°, in order to produce a sufficient surface area for cementing. Angles of wrap around up to 180° are also possible. With smaller demands the moulding process may also take place on the rods to be joined.

After the application of a suitable cement on to the contact surfaces the connecting element 24 is then cemented on to the rods 20, 22. For heavily stressed joints two connecting elements are conveniently provided, where the second connecting element 24' is then mounted on the opposite side. By means of the build-up of the connecting elements in the manner described there is achieved a butt joint which exhibits great strength without a direct connection between the two rods. The necessary resistance to bending of the connecting element is produced by the strengthening core. The fibres which extend in the longitudinal direction of the UD-coat ensure the necessary tensile and compression strengths.

In many applications the connecting elements could also be manufactured from sheet metal. In this case strengthening can be achieved by analogously arranged reinforcing seams or the like. A method for the manufacture of constructional elements of the type described above will be described in detail in the following with reference to the device illustrated schematically in FIGS. 8 and 9. In order to carry out the method a core strand of great length is employed. This core strand may have a circular cross section but may also have a cross section of a different form, for example a droplet form cross section. The core strand may here be a continuous strand consisting of a foam material. It may however also be made up of composite core sections which are provided at each end with force transmitting elements or which contain such sections.

The device illustrated in FIG. 8 has a system of five working positions, denoted by I-V.

In FIG. 8, the preparatory work is illustrated schematically in Station I in which the core sections 40, prefabricated in suitable lengths are introduced into a support 42 and, insofar as necessary, are connected with a preceding core section, for example cemented to it. Auxiliary devices not shown in the Figure may be provided and used for this purpose.

There is illustrated a core section 40 which has a force transmitting element 44 at its leading end and which is here joined to the rear end of the preceding core section 50 by means of a threaded pin 46 on a force transmitting element 48. As has been stated above it is also possible to provide a cemented joint, for example, with an intermediate core section. Cementing may take place with the use of a contact cement so that a simple pressing together is sufficient to produce the connection.

In the following Station II the core strand first passes through a wetting or soaking device 52 by means of which the whole surface of the core strand is externally wetted with synthetic resin. The soaking device 52 is convenient but not necessary. Resin dripping off is collected in a dish 58. A separate stripper may also be provided downstream from the soaking device. A soaking device will be described in detail below with reference to FIG. 11.

In Station II a layer of unidirectional fibres forming the UD-coat is then applied externally on to the core strand 54 by means of a device 58. The fibres 60 are here drawn out from a plurality of fibre spools 62 which may, for example, be, in each case, arranged on two parallel pairs of axes 64 which are situated with a displacement of 90° relative to one another. In order to ensure a taut and uniform distribution of the fibres of the UD-coat the fibre spools are preferably braked.

The fibres 60 drawn from the fibre spools 62 are led over guide pulleys 66 which are also arranged in the square. The fibres are then spread out fanwise in the form of a circle in a guide ring 68 with uniformly distributed means of guidance and then, in their dry state, reach by means of the section 70 below, a guide ring 72 by means of which they are brought into contact with the surface of the core strand which has, if necessary, been wetted with synthetic resin. The core provided with the UD-coat then passes through the soaking device 74. If another UD-layer is to be applied a similar device is introduced in series in Station II.

As a modification it is possible for the UD-layer to be applied in the form of prefabricated UD-bands. Such UD-bands are available commercially and can be supplied in any desired band breadth. The UD-layer may, for example, be supplied as a single band which has a breadth corresponding to the circumference of the core. Such a band may be conveyed by means of a funnel guide surrounding the core, as a tube which surrounds the core. Instead of a single band it is also possible to apply a plurality of bands the track breadths of which add up to the circumference of the core. Such a plurality of bands may also be led to the core by means of funnel guides.

Insofar as the core strand consists of partial strands made up with force transmitting elements the UD-coat is fixed on to the force transmitting elements in the following Station III. The force transmitting elements are, as described above, provided externally with a flat annular groove 45. In Station III a thread 76, preferably wetted with synthetic resin, is wound tightly many times around in the region of the annular groove. By means of this winding 78 the UD-coat is pressed into the flat annular groove. Two force transmitting elements following one another should always have the same distance so that both windings can be formed at the same time. Suitable detectors are provided to determine the position of the force transmitting elements. The winding device is illustrated schematically in FIG. 8 by two thread spools 80. The windings 78 are shown in black in the Figure. Station III may be omitted if operation is to be carried out with a continuous core of foam material only.

In the following Station IV the core strand provided with the UD-coat passes through a hose weaving machine 82 of known constructional type by means of which a diagonally woven sheath 84 is produced and, in particular, preferably as a ±45°-textile fabric. Behind the hose weaving machine in the direction of movement there is provided another soaking device 86. Here a resin stripper ring 88 is arranged on the downstream side, by means of which it is also possible to undertake calibration of the constructional element and which conveniently also had a compressing effect which promotes the soaking of the fibres. In a Station V sections of the strand are, in each case, separated from the strand 90 manufactured in this way before the synthetic resin has hardened.

Instead of using a hose weaving machine the braided hose may also be applied as a prefabricted braided hose in the device described. Such a modification of Station IV is shown in FIG. 10 as Station IVb. Here there is provided instead of the hose weaving machine a storage tube 81 with a mount 83. The storage tube can be inserted in the device by means of the mount 83 in such a way that the strand provided with the UD-coat is guided through the storage tube. A length of braided hose 79 is provided on the storage tube and, in particular, in a compressed form. It is possible in this way to house a relatively large length of braided hose on a storage tube of limited length. A heating device in the form of tongs can be provided to fix the end of the braided hose on to the strand which passes through by means of said heating device the braided hose is brought into contact with the strand, wetted with synthetic resin on the outer side of the UD-coat, and the synthetic resin is hardened so that the end of the braided hose is firmly attached to the strand. The braided hose 79 is then drawn from the storage tube continuously as the strand moves forward. A guide ring 85 is provided to produce close application to the surface of the strand.

The design of Station IVb as described in the foregoing only allows a discontinuous mode of operation. In order to introduce a fresh supply of braided hose the strand must be separated. This conveniently takes place upstream of the storage mount 83 in the direction of transport. It is here possible at the same time to provide heated tongs by means of which the synthetic resin which wets the UD-coat is thermally hardened over a limited section so that the UD-fibres remain connected in alignment with the core strand. Separation may take place downstream of this hardened section. After a new storage tube with a supply of braided hose has been introduced, the core strand with the UD-coat cemented to it is again pushed through the storage tube and, in particular, until it is picked up by the transport device described below. Subsequently the free end of the braided hose is attached to the strand in the manner described. Since exchange of the storage tube takes place quickly, a method which operates to apply the braided hose by means of Station IVb according to FIG. 10 as described above may also be described as a quasi-continuous method.

In Station V the strand is led through a heating apparatus 92 of limited length. By means of the heating apparatus 92 a forced hardening of the synthetic resin due to the excess temperature is carried out in a sectional with predetermined limits. This locally limited hardening serves solely for the purpose of joining the UD-coat and the braided hose into a solid unit over a limited length of the strand. The forward moving section of the strand may then be separated by means of a separating device, for example a saw 94, in the section hardened in this way.

The section of the strand which is separated has at each of its ends a section, short in relation to its total length, in which the synthetic resin has been hardened; it may then be laid in a Section VI into elongated aligning profiles or the like within which the strand section can thus be hardened while aligned in its correct configuration. It is also possible to lay the strands down within curved profiles where they can be given a predetermined form, for example axial displacement or the like, which will be retained after hardening.

In order to transport the strand through the device described means of transport which exert a tensile force on the strand must be provided. This tensile force preferably engages on a hardened section of the strand, preferably that section which has been forcibly hardened in the heating device 92. For example, an endless chain on which gripping devices are provided at predetermined intervals which are also capable of alteration according to requirements may be provided as the transport device. Such an arrangement is illustrated schematically in FIG. 9 which illustrates a modified embodiment of a combination of Stations V and VI according to FIG. 8.

Here the heating device 92 is, as shown by the double arrow 93, movable to and fro in the transport direction of the strand so that by means of the said device an exactly defined length of the continuously moving strand is subjected to a defined amount of heat and is thereby forcibly hardened. The heating device 92 may in this case be designed to be divided in the axial direction and able to swing open so that the beginning and the end of the time of reaction, which is determined by closure of the heating device, can be clearly defined. In FIG. 9 the hardened section 95 is indicated by shading.

Parallel to the direction of movement of the strand there is illustrated in FIG. 9 an endless conveyor chain 96 or the like with two guide pulleys 98. Gripping elements 100 are arranged on the conveyor chain at predetermined and, where necessary, adjustable distances and are so arranged and adjusted that, as is shown in the Figure, they always engage on the hardened section 95 of the strand. In this operation the strand is gripped by the holder 100 and is transported in the direction of the arrow 102 until the succeeding holder 100 comes into engagement with a hardened section 95. As soon as the strand is gripped by this holder the strand is separated in that region of the hardened section 95 which precedes the holder 100 by means of the saw 94. For this purpose the saw 94 can be moved at right angles to the axial direction—double arrow 106—and also, preferably, in the axial direction—double arrow 104.

Below the section 108 of the strand which is to be separated there is conveniently provided an elongated aligning member 110 with a V-shaped supporting groove, which may, for example, be lowered away and transported sideways as soon as this section has been separated from the succeeding section and has been freed from the gripping element 100 at its leading end. This movement is shown schematically by the arrow 112. The separated section of the strand then remains in the aligning member 110 until the synthetic resin has hardened. Correspondingly, it is necessary to provide a suitable number of aligning members or moulds with any given speed of transport.

As stated above, the aligning member 110 in which the separated sections of the strand 108 are hardened can be designed in straight line form. They could also be designed to be curved with large radii of curvature, for example in order to fabricate rods with end sections which are displaced parallel to the axis.

In the illustration according to FIG. 9 the separation takes place asymmetrically within the hardened section 95, where the longer part serves to convey the force of transport to the strand. The separation may, however also take place in other ways. In made-up constructional elements separation must always occur between two force transmitting elements where the separated section of the strand may also include a plurality of individual made-up constructional elements, which are separated after hardening.

It may be convenient to give the constructional elements an axial prestress in the UD-layer. For example, this may take place in that a suitable tensile force is applied in the longitudinal directional during hardening.

This tensile force may be introduced in a simple manner by means of the hardened end section. Thus, for example in FIG. 9 the hardened section at the left hand end of the separated strand may be anchored in the aligning member while a suitable tensile stress engages with the right-hand hardened section, for example by means of a cable rope anchored to this hardened section on which a suitable weight is hung by means of a guide pulley. It would also be possible to provide a prestressing spring which may act mechanically, pneumatically or hydraulically to produce the prestress.

It is, of course, also possible to cause the separated sections to harden under the controlled action of heat. For this purpose the aligning members in which the sections are deposited can be passed through a suitable oven.

In order to produce a smooth surface the finished constructional elements may be covered by a hose of a synthetic material which shrinks under the action of heat (shrink hose). The finished section of the construction element is here introduced into the shrink hose and the shrink hose is progressively heated, starting from one end of the constructional element, and is caused to shrink. The shrink hose thus comes into contact with the surface covered with synthetic resin without the formation of air bubbles. Owing to the heat taken up by the shrink hose heating of the synthetic resin is achieved at the same time so that the viscosity of the resin is reduced. Under the pressure exerted simultaneously by the shrink hose an improvement in the soaking of the individual fibres is produced thereby. At the same time excess synthetic resin is pressed out of the fibres and from between them and is transported during the progressive application of the shrink hose to the end of the constructional element. After the shrink hose has been shrunk on the strand is hardened in the desired configuration, if necessary under prestress. The shrink hose is removed after hardening.

After the hardening process the strands 108 are made up and, in particular, first by the separation of the sections 95 in which a forced hardening has occurred. These sections are lost sections since, owing to the forced heat hardening, the defined strength conditions are not present as these are produced during the natural hardening. Insofar as the constructional elements are to be supplied by the metre they are cut up into normal commercial lengths or according to the specification of the customers. Insofar as the finished strand 108 consists of made-up individual elements which are provided with force transmitting elements, separation of the strand takes place between the force transmitting elements. The means of connection and the projecting sections of the UD-layer and the braided hose are removed and the ends are grinded, if necessary.

As can be seen from the foregoing it is possible by means of the method described to carry out a continuous or quasi-continuous manufacture of constructional elements of large extension and, in particular, also of made-up elements. The precondition for a continuous fabrication is solely the continuous availability of the core strand. In this case it would also be possible for core sections of lesser or greater lengths to be introduced one after the other into the device without cementing, until they are taken up by the fibres of the UD-coat. Small distances between the core sections are not harmful.

A form of embodiment of a soaking device is illustrated in FIG. 11. The device has a tubular body 134 with a diameter greater than that of the strand to be wetted, which may here be the core strand 50. The tubular body 134 has a lateral extension 136 which, for example, can be designed to be directed upwards in the form of a stand pipe into which the liquid synthetic resin is introduced. However, the lateral extension 136 may also be designed with a smaller cross section as a conduit making connection with a central store of synthetic resin. In the form of embodiment according to FIG. 11 it is assumed that the core strand is moved forward from right to left. At each end of the tubular body 134 seal elements 138, 140 are provided. These seal elements close the ends of the tubular vessel. They may have tubular passages 142 in the seal element 138 and 144 or the seal element 140 respectively. The tubular passage 144 is designed in such a way that the surface of the strand is wetted with a defined amount of resin. A soaking device, such as is illustrated in FIG. 11, may, for example, consist of glass while the seal elements are formed by a shrink hose. The seal elements 138 and 140 could also have a different design and, for example, could carry sealing lips applied against the strand.

As stated in the foregoing, the core may be either a continuous core or may, however, consist of individual sections made up by means of force transmitting elements. The core strand itself may again consist of constructional elements in a sectional manner, that is of a core of foam material provided with a braided hose on its surface and, where necessary, with a UD-coat. Such strengthened sections of core may, for exmaple, be provided in sections which are particularly severely stressed.

An additional stiffening for the acceptance of high transverse forces can be achieved in that transversely situated rigid discs of small thickness are arranged within the core at predetermined distances. Thus, for example, aluminium discs could be cemented between the sections of core at predetermined distances. Such aluminium discs could have a wall thickness between 0.2 and 0.5 mm. They act here as a radial stiffening of the rod and constitute a sort of disc-shaped ribs. Locally concentrated transverse forces can be accepted by the disc-shaped ribs, in each case. Such very thin discs are enabled to accept high transverse forces since they are supported on each side by the hard foam of the core. It would also be possible to provide pressure resistant discs of other materials. As will easily be seen, other local stiffening elements of any type could be introduced into the core strand.

FIG. 1b illustrates the end section of a constructional element 116 as an example, this has in its right hand section a UD-coat 120 on a core 118 of foam material and over this a braided hose 122. A thin-walled metal disc 124 is cemented on flush against the front face of the core 118 of foam material and a core section 126 consisting of a core 128 of foam material with an outer braided hose 130. The external diameter of this section 126 of the core corresponds with the external diameter of the core 118. Another thin-walled metal disc 132 transverse to the axial direction is cemented between the sections of the core section 126 at a short distance from the left hand end. Such a strengthened section may, for example, constitute the end section, capable of accepting high load, of a constructional element, for example a section of a paddle shaft, the foot of a mast, or the like.

The method described is intended for the manufacture of rod-shaped constructional elements of large extension, that is with a large ration of length to diameter. The upper limit of diameter is about 75 mm. The method is, preferably, applied for the manufacture of constructional elements with diameters between 12 and 37 mm. The constructional elements can be manufactured with very small wall thicknesses that is the thickness of the layers of fibres soaked in synthetic resin. Wall thicknesses below 0.5 mm are typical. With a UD-layer of carbon fibres with a diameter of 0.1 mm and a braided hose consisting of carbon fibres with a wall thickness of 0.1 mm, thus a total wall thickness of 0.2 mm on a core of foam material of diameter 20 mm it is possible to produce a bending resistance of the constructional element which is almost 10% greater than the bending resistance of a steel tube of diameter 16 mm and wall thickness 0.5 mm. The weight is here only 62% of that of the steel tube. With two UD-layers and a wall thickness of 0.3 mm, the bending resistance is 165% of that of the steel tube with 75% of the weight.

The dry fibres referred to above are fibre bundles or "rovings" without impregnation with a synthetic resin.

I claim:

1. A construction element for the manufacture of a cemented joint between two constructional members of a rod-like shape fixed at an angle to one another, the construction element comprising a substantially planar section and two substantially curved sections integrally formed with the planar section at either end thereof, said curved sections having a curvature corresponding to the curvature of said constructional members, said planar sections and said curved sections being integrally formed from a flattened braided tubular member, a core layer in the form of a sheet disposed in said tubular member and a fiber layer disposed on one side of said core layer, said fiber layer having fibers extending longitudinally to enhance the tensile and compression strengths of said element.

2. The construction element of claim 1, wherein said planar section further includes a central region and two edge regions, said central region having a stiffening layer disposed on the opposed side of said core layer.

3. The construction element of claim 1, wherein said tubular member is embedded in a synthetic resin.

4. The construction element of claim 1, wherein said planar section further includes a core strengthening layer disposed between said tubular member and said core layer, said core strengthing layer having a triangular form and made from a hard foam.

* * * * *

UNITED STATES PATENT AND TRADEMARK OFFICE
CERTIFICATE OF CORRECTION

PATENT NO. : 4,652,171
DATED : March 24, 1987
INVENTOR(S) : Rainer Schutze

It is certified that error appears in the above-identified patent and that said Letters Patent is hereby corrected as shown below:

On the title page, Item [73] should read

-- Assignee: Deutsche Forschungs- und Versuchsanstalt fur Luft- und Raumfahrt e.V. --.

Signed and Sealed this

Eleventh Day of April, 1989

Attest:

DONALD J. QUIGG

*Attesting Officer*   *Commissioner of Patents and Trademarks*